(12) United States Patent
Takashima et al.

(10) Patent No.: US 11,293,074 B2
(45) Date of Patent: Apr. 5, 2022

(54) HOT-PRESSED MEMBER AND METHOD FOR MANUFACTURING SAME, AND COLD-ROLLED STEEL SHEET FOR HOT PRESSING AND METHOD FOR MANUFACTURING SAME

(71) Applicant: JFE STEEL CORPORATION, Tokyo (JP)

(72) Inventors: Katsutoshi Takashima, Tokyo (JP); Chikaumi Sawanishi, Tokyo (JP); Takashi Kobayashi, Tokyo (JP); Yoshimasa Funakawa, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 339 days.

(21) Appl. No.: 16/617,133

(22) PCT Filed: Mar. 30, 2018

(86) PCT No.: PCT/JP2018/013718
§ 371 (c)(1),
(2) Date: Nov. 26, 2019

(87) PCT Pub. No.: WO2019/003540
PCT Pub. Date: Jan. 3, 2019

(65) Prior Publication Data
US 2020/0354806 A1    Nov. 12, 2020

(30) Foreign Application Priority Data
Jun. 30, 2017   (WO) .............. PCT/JP2017/024258

(51) Int. Cl.
| | | |
|---|---|---|
| *C21D 9/46* | (2006.01) |
| *B21D 22/02* | (2006.01) |
| *B32B 15/01* | (2006.01) |
| *C21D 1/18* | (2006.01) |
| *C21D 6/00* | (2006.01) |
| *C21D 8/02* | (2006.01) |
| *C22C 38/00* | (2006.01) |
| *C22C 38/02* | (2006.01) |
| *C22C 38/06* | (2006.01) |
| *C22C 38/08* | (2006.01) |
| *C22C 38/10* | (2006.01) |
| *C22C 38/16* | (2006.01) |
| *C22C 38/26* | (2006.01) |
| *C22C 38/28* | (2006.01) |
| *C22C 38/32* | (2006.01) |
| *C22C 38/38* | (2006.01) |

(52) U.S. Cl.
CPC .............. *C21D 9/46* (2013.01); *B21D 22/022* (2013.01); *B32B 15/015* (2013.01); *C21D 1/18* (2013.01); *C21D 6/001* (2013.01); *C21D 6/002* (2013.01); *C21D 6/005* (2013.01); *C21D 6/007* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/008* (2013.01); *C22C 38/02* (2013.01); *C22C 38/06* (2013.01); *C22C 38/08* (2013.01); *C22C 38/10* (2013.01); *C22C 38/16* (2013.01); *C22C 38/26* (2013.01); *C22C 38/28* (2013.01); *C22C 38/32* (2013.01); *C22C 38/38* (2013.01); *C21D 2211/004* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 9,725,782 B2 * | 8/2017 | Nonaka | C21D 9/46 |
| 10,060,005 B2 | 8/2018 | Hikida et al. | |
| 10,308,996 B2 | 6/2019 | Bae et al. | |
| 2008/0286603 A1 | 11/2008 | Oh et al. | |

(Continued)

FOREIGN PATENT DOCUMENTS

| | | |
|---|---|---|
| CN | 101316942 A | 12/2008 |
| CN | 101484601 A | 7/2009 |

(Continued)

OTHER PUBLICATIONS

Mar. 19, 2020, the Extended European Search Report issued by the European Patent Office in the corresponding European Patent Application No. 18823555.0.

(Continued)

*Primary Examiner* — Daniel J. Schleis
(74) *Attorney, Agent, or Firm* — Kenja IP Law PC

(57) ABSTRACT

Disclosed is a hot-pressed member that can exhibit very high tensile strength after hot pressing as high as TS: 1780 MPa or more, excellent resistance to resistance welding cracking, and excellent delayed fracture resistance after resistance welding by having a specific chemical composition, and a microstructure such that a prior austenite average grain size is 7 μm or less, a volume fraction of martensite is 90% or more, and at least 5 Nb-based precipitates having a grain size of less than 0.08 μm are present on average per 100 μm² of a cross section parallel to a thickness direction of the member within a range of 100 μm in the thickness direction from a surface of the member, and such that a Ni diffusion region having a thickness of 0.5 μm or more is present in a surface layer of the member.

8 Claims, No Drawings

(56) References Cited

U.S. PATENT DOCUMENTS

| | | | | |
|---|---|---|---|---|
| 2013/0095347 A1* | 4/2013 | Kawasaki | ............... | B21B 1/026 428/684 |
| 2017/0029913 A1* | 2/2017 | Bae | ......................... | C22C 21/02 |
| 2017/0096724 A1* | 4/2017 | Hikida | ................... | C21D 1/673 |

FOREIGN PATENT DOCUMENTS

| | | |
|---|---|---|
| CN | 102939399 A | 2/2013 |
| CN | 106103782 A | 11/2016 |
| CN | 106399834 A | 2/2017 |
| EP | 2975150 A1 | 1/2016 |
| EP | 3124637 A1 | 2/2017 |
| JP | 2001123222 A | 5/2001 |
| JP | 2006009116 A | 1/2006 |
| JP | 2011173135 A | 9/2011 |
| JP | 2013226599 A | 11/2013 |
| JP | 2015093282 A | 5/2015 |
| JP | 2015151615 A | 8/2015 |
| JP | 2016089274 A | 5/2016 |
| WO | 2007129676 A1 | 11/2007 |
| WO | 2015147216 A1 | 10/2015 |

OTHER PUBLICATIONS

Jan. 26, 2021, Office Action issued by the China National Intellectual Property Administration in the corresponding Chinese Patent Application No. 201880042595.3 with English language search report.

Jun. 26, 2018, International Search Report issued in the International Patent Application No. PCT/JP2018/013718.

* cited by examiner

HOT-PRESSED MEMBER AND METHOD FOR MANUFACTURING SAME, AND COLD-ROLLED STEEL SHEET FOR HOT PRESSING AND METHOD FOR MANUFACTURING SAME

BACKGROUND

The present disclosure relates to a hot-pressed member and a method for manufacturing the same, and a cold-rolled steel sheet for hot pressing and a method for manufacturing the same, and particularly to the improvement of resistance to resistance welding cracking and delayed fracture resistance after resistance welding of a hot-pressed member.

As used herein, the term "hot-pressed member" refers to a member obtained by hot press forming a cold-rolled steel sheet having quench hardenability to increase its strength.

BACKGROUND

In recent years, $CO_2$ emission regulations have become more stringent due to rising environmental problems, and in the automobile field, weight reduction of vehicle bodies has become an issue for reduced fuel consumption. To this end, sheet metal thinning by application of high-strength steel sheets to automobile parts is advanced, and application of steel sheets with tensile strength (TS) of 1780 MPa or more is considered.

High-strength steel sheets used for structural members and reinforcing members of automobiles are required to have excellent formability. However, in a steel sheet with TS of 1780 MPa or more, cracking would occur during cold press forming due to low ductility and large spring back would occur due to high yield strength. Therefore, after cold press forming, high dimension accuracy can not be obtained.

Under such circumstances, as a method for obtaining high strength, recently, press forming by hot pressing (also referred to as hot stamping, die quenching, press quenching, and so on) has been focused. Hot pressing is a forming method that enables forming with high dimensional accuracy by heating a steel sheet to the temperature range of austenite single phase and then forming (processing) the steel sheet at the high temperature, and that enables increase of the strength through quenching by cooling the steel sheet after the forming.

However, most of the automobile assembly processes are accomplished by resistance spot welding, and when there is a coating or plating containing Zn on the surface of a cold rolled steel sheet for hot pressing, or when a cold rolled steel sheet for hot pressing is assembled by resistance spot welding with a coated or plated steel sheet containing Zn even if not coated or plated (without being subjected to coating or plating treatment), there is a concern about resistance welding cracking in which the zinc on the surface of the steel sheet melts during welding, and residual stress is generated in the vicinity of the weld, causing liquid metal embrittlement and cracks in the steel sheet.

Furthermore, when resistance spot welding is performed in the presence of a sheet gap, stress is applied to nugget ends, and thus upon exposure to a corrosive environment in that state, there is a concern about delayed fracture after resistance welding in which cracking occurs from the nugget ends upon entry of hydrogen.

Conventionally, as a method of suppressing liquid metal embrittlement at the time of hot pressing, JP2013-226599A (PTL 1) describes a method of controlling the radius of curvature of the shoulder of the mold at the time of pressing, the thickness of the steel sheet, and the molding start temperature. In addition, as a method of suppressing delayed fracture at a resistance spot welded portion, JP2015-93282A (PTL 2) describes a method of controlling welding conditions.

CITATION LIST

Patent Literature

PTL 1: JP2013-226599A
PTL 2: JP2015-93282A

SUMMARY

Technical Problem

However, liquid metal embrittlement occurring at the time of resistance spot welding is such embrittlement that occurs in a short time and in a high temperature range compared to liquid metal embrittlement that occurs at the time of hot pressing, and the mechanism of generation of liquid metal embrittlement is completely different between the two.

In addition, it is conceivable to suppress the occurrence of liquid metal embrittlement by changing the welding conditions as in PTL 2, yet in that case it is necessary to replace the welding machine and the cost increases accordingly. Therefore, it has been desired to suppress resistance welding cracking and delayed fracture after resistance welding by improvement of the steel sheet itself.

Solution to Problem

As a result of our extensive investigations in view of the above circumstances, the present inventors discovered: for suppressing resistance welding cracking and delayed fracture after resistance welding in a hot-pressed member, it is effective to control the prior austenite grain boundaries as the microstructure of the member, to disperse fine Nb-based precipitates in the surface layer of the member, and furthermore, to have a Ni diffusion layer on the surface layer of the member; and this setup make it possible to suppress resistance welding cracking and delayed fracture after resistance welding in the hot-pressed member while maintaining high tensile strength.

Liquid metal embrittlement at the time of resistance spot welding of a hot-pressed member is caused by a tensile stress due to solidification shrinkage upon entry of Zn into former austenite grain boundaries at a welding heat affected zone (HAZ) in the vicinity of a nugget during resistance spot welding, or by a tensile stress at the time of opening the electrode due to a bending moment upon generation of a strike angle, and so on.

As a specific countermeasure for this problem, the inventors discovered that by dispersing fine Nb-based precipitates within a range of 100 μm in the thickness direction from the surface of the member to refine the prior austenite average grain size, and by maintaining this refinement even during resistance spot welding to improve the toughness at high temperature, the resistance to resistance welding cracking of the hot-pressed member is improved.

The inventors also discovered that since the presence of a Ni diffusion region (also referred to as a Ni diffusion layer) in the surface layer of the member can suppress the entry of Zn melted at the time of resistance welding into the prior austenite grain boundaries, the resistance to resistance welding cracking of the hot-pressed member is improved.

The inventors also discovered that regarding delayed fracture after resistance welding, the influence of hydrogen is suppressed even in a corrosive environment by dispersing fine Nb-based precipitates within a range of 100 μm in the thickness direction from the surface of the member to form hydrogen trapping sites, and furthermore, since the Ni diffusion layer has the effect of making the potential more noble, the amount of hydrogen generation can be suppressed, and as a result, the delayed fracture resistance after resistance welding is improved.

The present disclosure was completed based on the above discoveries.

Specifically, primary features of the present disclosure are as follows.

1. A hot-pressed member comprising: a steel chemical composition containing (consisting of), by mass %, C: 0.28% or more and less than 0.42%, Si: 0.05% or more and 1.5% or less, Mn: 1.0% or more and 3.0% or less, P: 0.05% or less, S: 0.005% or less, Al: 0.01% or more and 0.50% or less, N: 0.005% or less, Nb: 0.001% or more and 0.10% or less, Ti: 0.001% or more and 0.15% or less, and B: 0.0002% or more and 0.0040% or less, with the balance being Fe and inevitable impurities; a microstructure in which a prior austenite average grain size is 7 μm or less, a volume fraction of martensite is 90% or more, and at least 5 Nb-based precipitates having a grain size of less than 0.08 μm are present on average per 100 μm$^2$ of a cross section parallel to a thickness direction of the member within a range of 100 μm in the thickness direction from a surface of the member; a Ni diffusion region having a thickness of 0.5 μm or more present in a surface layer of the member; and a tensile strength of 1780 MPa or more.

2. The hot-pressed member according to 1., wherein the steel chemical composition further contains, by mass %, at least one selected from the group consisting of Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. A cold-rolled steel sheet for hot pressing, comprising: a chemical composition containing (consisting of), by mass %, C: 0.28% or more and less than 0.42%, Si: 0.05% or more and 1.5% or less, Mn: 1.0% or more and 3.0% or less, P: 0.05% or less, S: 0.005% or less, Al: 0.01% or more and 0.50% or less, N: 0.005% or less, and Nb: 0.001% or more and 0.10% or less, Ti: 0.001% or more and 0.15% or less, and B: 0.0002% or more and 0.0040% or less, with the balance being Fe and inevitable impurities; a microstructure which contains 20% or more by volume fraction of ferrite having an average grain aspect ratio of 2.5 or less, 10% or more by volume fraction of martensite having an average grain size of 6 μm or less, and at least 10 Nb-based precipitates having a grain size of less than 0.08 μm present on average per 100 μm$^2$ of a cross section parallel to a thickness direction of the steel sheet within a range of 100 μm in the thickness direction from a surface of the steel sheet; and a Ni or Ni alloy coating or plating layer having a thickness of 0.5 μm or more on the surface of the steel sheet.

4. The cold-rolled steel sheet for hot pressing according to 3., wherein the chemical composition further contains, by mass %, at least one selected from Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

5. A method for manufacturing the cold-rolled steel sheet for hot pressing as recited in 3., the method comprising: preparing a steel raw material comprising a chemical composition containing (consisting of), by mass %, C: 0.28% or more and less than 0.42%, Si: 0.05% or more and 1.5% or less, Mn: 1.0% or more and 3.0% or less, P: 0.05% or less, S: 0.005% or less, Al: 0.01% or more and 0.50% or less, N: 0.005% or less, and Nb: 0.001% or more and 0.10% or less, Ti: 0.001% or more and 0.15% or less, and B: 0.0002% or more and 0.0040% or less, with the balance being Fe and inevitable impurities; hot rolling the steel raw material to obtain a hot-rolled steel sheet under a condition of a finisher delivery temperature of 850° C. to 1000° C.; after the hot rolling, cooling the hot-rolled steel sheet to a coiling temperature of 500° C. or lower at an average cooling rate of 40° C./s or higher; then pickling and cold rolling the coiled hot-rolled steel sheet to obtain a cold-rolled steel sheet, and then subjecting the cold-rolled steel sheet to a first annealing whereby the steel sheet is heated to a temperature range of 850° C. or higher, cooled to a temperature range of 350° C. to 450° C., held for 300 seconds or longer in the temperature range of 350° C. to 450° C., and then cooled to room temperature; then subjecting the cold-rolled steel sheet to a second heat treatment whereby the cold-rolled steel sheet is heated to a temperature range of 720° C. to 820° C. at an average heating rate of 3° C./s to 30° C./s, held for 15 seconds or longer in the temperature range of 720° C. to 820° C., and then cooled to a cooling end temperature range of 600° C. or lower at an average cooling rate of 5° C./s or higher; and then applying a Ni or Ni alloy coating or plating treatment to a surface of the cold-rolled steel sheet.

6. The method for manufacturing the cold-rolled steel sheet for hot pressing according to 5., wherein the chemical composition further contains, by mass %, at least one selected from the group consisting of Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

7. A method for manufacturing a hot-pressed member, comprising: heating the cold-rolled steel sheet for hot pressing as recited in 3. or 4. in a temperature range of an $Ac_3$ transformation temperature to 1000° C.; and then hot pressing the steel sheet.

Advantageous Effect

According to the present disclosure, it is possible to obtain a hot-pressed member which has extremely high tensile strength after hot pressing and also has excellent resistance to resistance welding cracking and delayed fracture resistance after resistance welding (hereinafter, delayed fracture resistance after resistance welding may be simply referred to as delayed fracture resistance). For example, it is possible to stably obtain a hot-pressed member which is excellent in resistance to resistance welding cracking and delayed fracture resistance, which has a tensile strength of 1780 MPa or more, and in which resistance welding cracking does not occur even when the electrodes are used at an angle with respect to the steel sheet and no cracking occurs even after immersion in hydrochloric acid following the resistance welding.

Further, according to the present disclosure, it is possible to obtain a hot-pressed member with stable properties even under hot pressing conditions with large variations at the time of heating.

DETAILED DESCRIPTION

The following provides the details of the present disclosure.

First, the reasons for limitations placed on the chemical composition of the hot-pressed member and the cold-rolled steel sheet for hot pressing according to the present disclosure will be described in detail. When components are expressed in "%", this refers to "mass %".

C: 0.28% or More and Less than 0.42%

C is an element effective for increasing the strength of the steel, and is an important element for strengthening martensite after hot pressing to increase the strength of the steel. However, if the C content is less than 0.28%, the hardness of martensite after hot pressing is insufficient, and a tensile strength of 1780 MPa or more can not be obtained. The C content is preferably 0.30% or more. On the other hand, when C is added by 0.42% or more, the hardness after resistance spot welding increases, the toughness decreases, and the resistance to resistance welding cracking and the delayed fracture resistance decrease. Therefore, the C content is less than 0.40%.

Preferably, it is less than 0.39%.

Si: 0.05% or More and 1.5% or Less

Si is an element effective for solid solution strengthening of ferrite and increasing the strength. To obtain this effect, the Si content needs to be 0.05% or more. However, excessive addition of Si causes a relative decrease in intergranular strength as compared with intragranular strength during resistance spot welding, with the result that Zn enters into the grain boundaries and embrittlement easily occurs and that the alloying behavior of the molten Zn changes, causing deterioration of the resistance to resistance welding cracking and the delayed fracture resistance. Therefore, the Si content is 1.5% or less. It is preferably 1.2% or less, and more preferably 0.8% or less.

Mn: 1.0% or More and 3.0% or Less

Mn is an element that increases the quench hardenability during hot pressing, and thus contributes to the formation of martensite after hot pressing, that is, the increase in strength. To obtain this effect, the Mn content needs to be 1.0% or more. Preferably, it is 1.2% or more. However, when Mn is excessively added, tempering of martensite in the HAZ after resistance welding is insufficient, and the toughness of the HAZ deteriorates, resulting in lower resistance to resistance welding cracking. Therefore, the Mn content is 3.0% or less. Preferably, it is 2.8% or less.

P: 0.05% or Less

P contributes to the increase in strength by solid solution strengthening. However, when added excessively, segregation of P at grain boundaries becomes remarkable, the grain boundaries are embrittled, and the resistance to resistance welding cracking and the delayed fracture resistance are deteriorated. Therefore, the P content is 0.05% or less. Preferably, it is 0.04% or less. Although the lower limit of the P content is not particularly specified, it is preferable to set it at 0.0005% because making the P content extremely low leads to an increase in steelmaking cost.

S: 0.005% or Less

When the S content is high, a large amount of sulfides such as MnS is formed, causing deterioration of the resistance to resistance welding cracking and the delayed fracture resistance. Therefore, an upper limit of the S content is 0.005%. Preferably, it is 0.0045% or less. Although the lower limit of the S content is not particularly specified, it is preferable to set it at 0.0002% because, as is the case with P, making the S content extremely low leads to an increase in steelmaking cost.

Al: 0.01% or More and 0.50% or Less

Al is an element necessary for deoxidation. To obtain this effect, the Al content needs to be 0.01% or more. On the other hand, adding Al beyond 0.50% does not increase this effect. Therefore, the Al content is 0.50% or less. Preferably, it is 0.40% or less.

N: 0.005% or Less

Since N forms a coarse nitride with Ti and degrades the resistance to resistance welding cracking and the delayed fracture resistance, it is necessary to suppress the content. In particular, when the N content exceeds 0.005%, this tendency becomes remarkable. Therefore, the N content is 0.005% or less. It is preferably 0.004% or less, and more preferably 0.0035% or less.

Nb: 0.001% or More and 0.10% or Less

Nb is an element that contributes to the increase in strength by forming fine carbonitrides. Furthermore, in the present disclosure, since fine Nb-based precipitates refine the austenite grain size during hot pressing and this refinement is maintained even after resistance spot welding, and thus toughness is improved, resulting in improved resistance to resistance welding cracking. In addition, fine Nb-based precipitates serve as hydrogen trapping sites, and thus the delayed fracture resistance after resistance welding is also improved. To obtain this effect, the Nb content needs to be 0.001% or more. On the other hand, adding a large amount of Nb fails to further increase the above effect, but instead increases the cost. Therefore, the Nb content is 0.10% or less. It is preferably 0.09% or less.

Ti: 0.001% or More and 0.15% or Less

Ti, like Nb, is an element that contributes to the improvement in the resistance to resistance welding cracking and the delayed fracture resistance by forming fine carbonitrides. To obtain this effect, the Ti content needs to be 0.001% or more. On the other hand, when a large amount of Ti is added, the elongation after hot pressing is significantly reduced. Therefore, the Ti content is 0.15% or less. It is preferably 0.12% or less.

B: 0.0002% or More and 0.0040% or Less

B is an element that increases the quench hardenability during hot pressing, and thus contributes to the formation of martensite after hot pressing, that is, the increase in strength. B also improves the grain boundary strength by segregation at grain boundaries, it is effective for increasing the resistance to resistance welding cracking. To obtain this effect, the B content needs to be 0.0002% or more. However, excessive addition of B does not increase this effect. Therefore, the B content is 0.0040% or less.

Moreover, in the present disclosure, the following components may be appropriately contained.

Mo: 0.50% or Less

Mo is an element that increases the quench hardenability during hot pressing, and thus contributes to the formation of martensite after hot pressing, that is, the increase in strength. To obtain this effect, the Mo content is preferably 0.005% or more. It is more preferably 0.01% or more. On the other hand, even if a large amount of Mo is added, the above effect is saturated, leading to an increase in cost, and causing deterioration of the chemical conversion treatment property. Therefore, the Mo content is preferably 0.50% or less.

Cr: 0.50% or Less

Cr, like Mo, is an element that increases the quench hardenability during hot pressing, and thus contributes to the formation of martensite after hot pressing, that is, the increase in strength. To obtain this effect, the Cr content is preferably 0.005% or more. It is more preferably 0.01% or more. On the other hand, even if a large amount of Cr is added, the above effect is saturated, and a surface oxide is formed, deteriorating the coatability. Therefore, the Cr content is preferably 0.50% or less.

Sb: 0.001% or More and 0.020% or Less

Sb has the effect of suppressing the formation of a decarburized layer in a surface layer part of a steel sheet before heating of the steel sheet prior to hot pressing and subsequent cooling through a series of processes of hot pressing. Accordingly, the hardness distribution of the sheet surface becomes uniform, and the resistance to local stress increases, with the result that the resistance to resistance welding cracking and the delayed fracture resistance are improved. To obtain this effect, the Sb content is preferably 0.001% or more. On the other hand, if Sb is added in excess of 0.020%, the rolling load increases and the productivity decreases. Therefore, the Sb content is preferably 0.020% or less.

Ca: 0.005% or Less, Mg: 0.005% or Less, REM: 0.005% or Less

Ca, Mg, and REM control the shapes of sulfides and oxides, and suppress the formation of coarse inclusions, thereby improving the resistance to resistance welding cracking and the delayed fracture resistance. To obtain this effect, it is preferable to add each element in an amount of 0.0005% or more. However, excessive addition causes an increase in inclusions and deterioration of the resistance to resistance welding cracking and the delayed fracture resistance. Therefore, the content of each added element is preferably 0.005% or less. Here, REM is an element containing Sc, Y, and lanthanoid elements.

V: 0.15% or Less

V is an element that contributes to the increase in strength by forming a fine carbonitride. To obtain this effect, the V content is preferably 0.01% or more. On the other hand, since adding a large amount of V lowers the toughness at the time of resistance welding and reduces the resistance to resistance welding cracking and the delayed fracture resistance. Therefore, the V content is preferably 0.15% or less. It is more preferably 0.10% or less.

Cu: 0.50% or Less

Cu can be added as needed because not only does it contribute to the increase in strength by solid solution strengthening, but it improves the corrosion resistance and thus can improve the delayed fracture resistance. To obtain these effects, the Cu content is preferably 0.05% or more. On the other hand, if Cu is added in excess of 0.50%, the effect is saturated and surface defects resulting from Cu tend to occur more frequently. Therefore, the Cu content is preferably 0.50% or less.

Ni: 0.50% or Less

Similarly to Cu, Ni can also be added as needed because it can improve the delayed fracture resistance by improving the corrosion resistance. Moreover, when added simultaneously with Cu, Ni has the effect of suppressing surface defects caused by Cu. Thus, when Cu is added, addition of Ni is effective. To obtain these effects, the Ni content is 0.05% or more. However, since adding a large amount of Ni lowers the toughness at the time of resistance welding and reduces the resistance to resistance welding cracking. Therefore, the Ni content is preferably 0.50% or less.

Sn: 0.50% or Less

Similarly to Cu and Ni, Sn can also be added as needed because it can improve the delayed fracture resistance by improving the corrosion resistance. To obtain these effects, the Sn content is 0.05% or more. However, the addition of a large amount of Sn lowers the toughness at the time of resistance welding and reduces the resistance to resistance welding cracking. Therefore, the Sn content is preferably 0.50% or less.

Zn: 0.10% or Less

Zn is an element that contributes to the formation of martensite after hot pressing, and thus contributes to the formation of martensite after hot pressing, that is, the increase in strength. To obtain these effects, the Zn content is preferably 0.005% or more. However, the addition of a large amount of Zn lowers the toughness at the time of resistance welding and deteriorates the resistance to resistance welding cracking and the delayed fracture resistance. Therefore, the Zn content is preferably 0.10% or less.

Co: 0.10% or Less

Similarly to Cu and Ni, Co can also be added as needed because it can improve the delayed fracture resistance as it increases the corrosion resistance by improving the hydrogen overvoltage. To obtain these effects, the Co content is preferably 0.005% or more. However, the addition of a large amount of Co lowers the toughness at the time of resistance welding and deteriorates the resistance to resistance welding cracking and the delayed fracture resistance. Therefore, the Co content is preferably 0.10% or less.

Zr: 0.10% or Less

Similarly to Cu and Ni, Zr can also be added as needed because it can improve the delayed fracture resistance by improving the corrosion resistance. To obtain these effects, the Zr content is preferably 0.005% or more. However, the addition of a large amount of Zr lowers the toughness at the time of resistance welding and deteriorates the resistance to resistance welding cracking and the delayed fracture resistance. Therefore, the Zr content is preferably 0.10% or less.

Ta: 0.10% or Less

Ta, like Ti, forms alloy carbides and alloy nitrides and contributes to the increase in strength. To obtain this effect, the Ta content is preferably 0.005% or more. Excessively adding Ta, however, fails to increase the addition effect, but instead results in a rise in alloying cost. Therefore, the Ta content is preferably 0.10% or less.

W: 0.10% or Less

Similarly to Cu and Ni, W can also be added as needed since it can improve the delayed fracture resistance by improving the corrosion resistance. To obtain these effects, the W content is preferably 0.005% or more. However, since adding a large amount of W lowers the toughness at the time of resistance welding and reduces the resistance to resistance welding cracking. Therefore, the W content is preferably 0.10% or less.

The balance other than the above is Fe and inevitable impurities.

Next, the microstructures of the hot-pressed member and the cold-rolled steel sheet for hot pressing according to the present disclosure will be described in detail.

[Microstructure of Hot-Pressed Member]

The microstructure of the hot-pressed member is a microstructure in which a prior austenite average grain size is 7 μm or less, a volume fraction of martensite is 90% or more, and at least 5 Nb-based precipitates having a grain size of less than 0.08 μm are present on average per 100 μm$^2$ of a cross section parallel to a thickness direction of the member in a range of 100 µm in the thickness direction from the surface of the member.

If the prior austenite average grain size exceeds 7 µm after hot pressing, the toughness after resistance welding is reduced, and thus the resistance to resistance welding cracking is deteriorated. Therefore, the average grain size of prior austenite is 7 µm or less. Preferably, it is 6.5 µm or less. Further, if the volume fraction of martensite is less than 90%, the desired tensile strength can not be obtained. Therefore, the volume fraction of martensite is 90% or more.

If the number of Nb-based precipitates having a particle size of less than 0.08 µm present on average per 100 µm' of a cross section parallel to the thickness direction of the member in a range of 100 µm in the thickness direction from the surface of the member after being subjected to hot pressing is less than 5, the austenite grains become coarsened in the middle of reverse transformation to austenite single phase during resistance welding, and when Zn enters into austenite grain boundaries, the toughness upon application of tensile stress is deteriorated, resulting in lower resistance to resistance welding cracking. In addition, the function as a hydrogen trapping site also becomes insufficient, and the delayed fracture resistance after resistance welding also deteriorates. The cross section parallel to the thickness direction of the member to be measured is not particularly limited, and any cross section may be used.

As used herein, the Nb-based precipitates refer to, for example, NbC, NbN, Nb(C,N), and the like.

Further, the presence of a Ni diffusion region having a thickness of 0.5 µm or more in the surface layer of the member improves the resistance to resistance welding cracking and the delayed fracture resistance. Therefore, a Ni diffusion region having a thickness of 0.5 µm or more should be present in the surface layer of the member after being subjected to hot pressing.

[Microstructure of Cold-Rolled Steel Sheet for Hot Pressing]

In order to obtain desired properties as a hot pressed member, it is important to control the microstructure of the cold-rolled steel sheet for hot pressing. That is, the microstructure of the cold-rolled steel sheet for hot pressing is a microstructure which contains 20% or more by volume fraction of ferrite having an average grain aspect ratio of 2.5 or less, 10% or more by volume fraction of martensite having an average grain size of 6 µm or less, and at least 10 Nb-based precipitates having a grain size of less than 0.08 µm present on average per 100 µm$^2$ of a cross section parallel to a thickness direction of the steel sheet within a range of 100 µm in the thickness direction from a surface of the steel sheet.

In the cold-rolled steel sheet for hot pressing, when the average aspect ratio of ferrite grains exceeds 2.5, the desired prior austenite grain size can not be secured after hot pressing, and the resistance to resistance welding cracking and the delayed fracture resistance are degraded. If the volume fraction of ferrite is less than 20%, recrystallization resulting from reverse transformation during hot pressing becomes insufficient, and the desired prior austenite grain size can not be obtained after hot pressing, leading to deterioration of the resistance to resistance welding cracking and the delayed resi stance.

If the average grain size of martensite exceeds 6 µm, the desired prior austenite grain size can not be secured after hot pressing, leading to deterioration of the resistance to resistance welding cracking and the delayed fracture resistance. Similarly, if the volume fraction of martensite is less than 10%, the desired prior austenite grain size can not be secured after hot pressing, leading to deterioration of the resistance to resistance welding cracking and the delayed fracture resistance.

Furthermore, if the number of Nb-based precipitates having a grain size of less than 0.08 µm present on average per 100 µm$^2$ of a cross section parallel to the thickness direction of the steel sheet after being subjected to hot pressing in a range of 100 µm in the thickness direction from the surface of the steel sheet is less than 10, it becomes difficult to secure the presence of at least 5 Nb-based precipitates having a grain size of less than 0.08 µm on average per 100 µm$^2$ of the cross section parallel to the thickness direction in the range of 100 µm in the thickness direction from the surface of the member, leading to deterioration of the resistance to resistance welding cracking and the delayed fracture resistance. In addition, no particular limitation is placed on the cross section parallel to the thickness direction of the steel sheet to be measured, and a so-called C or L cross section may be used.

Next, the cold-rolled steel sheet for hot pressing and the coating or plating layer of the hot-pressed member according to the present disclosure will be described in detail.

[Coating or Plating Layer of Cold-rolled Steel Sheet for Hot Pressing]

A coating or plating layer to be applied onto the surface of the cold-rolled steel sheet for hot pressing according to the present disclosure is a Ni or Ni alloy coating or plating layer. Applying such coating or plating layer onto the surface of the cold-rolled steel sheet for hot pressing secures the presence of a Ni diffusion layer in the surface layer of the member after being subjected to hot pressing, contributing to the improvement in the resistance to resistance welding cracking and the delayed fracture resistance of the hot-pressed member.

The Ni or Ni alloy coating or plating layer may be a hot-dip coating layer or an electroplating layer as long as it contains Ni. Examples thereof include those containing Ni in a coating or plating layer such as a hot-dip galvanizing layer formed by hot dip coating, a galvannealing layer formed by alloying it, a hot-dip Al coating layer, or a Zn electroplating layer formed by electroplating. Another example is a Zn—Ni alloy electroplating layer.

However, the Ni or Ni alloy coating or plating layer is not limited to the above-described coating or plating layers, and may be a coating or plating layer which contains at least one of Al, Zn, Si, Mg, Fe, Co, Mn, Sn, Pb, Be, B, P, S, Ti, V, W, Mo, Sb, Cd, Nb, Cr, and Sr in addition to the main component, Ni. The method for forming the Ni or Ni alloy coating or plating layer is not limited to the disclosed method at all, and any known hot dip coating, electroplating, vapor deposition plating, or the like is applicable. The Ni or Ni alloy coating or plating layer may be a coating or plating layer subjected to an alloying treatment after the coating or plating step.

In the present disclosure, in particular, it is more preferable that the Ni or Ni alloy coating or plating layer is a Zn—Ni alloy coating or plating layer in order to further improve the corrosion resistance of the hot-pressed member or to prevent liquid metal embrittlement cracking caused by molten Zn during hot press forming.

The thickness of the coating or plating layer is set to 0.5 µm or more such that a Ni diffusion layer of a desired thickness is present in the surface layer of the steel sheet after being subjected to hot pressing. Note that the upper limit of the thickness of the coating or plating layer is not particularly limited, yet in order to avoid the adhesion of the coating or plating to the mold at the time of hot pressing, the thickness is preferably 100 μm or less.

[Coating or Plating Layer of Hot-Pressed Member]

When a cold-rolled steel sheet for hot pressing to which an Ni or Ni alloy coating or plating layer is applied is heated and then hot-pressed, some or all of the coating or plating layer components contained in the Ni or Ni alloy coating or plating layer diffuse into the base steel sheet to form a solid solution phase or an intermetallic compound, and at the same time, conversely, Fe which is a component of the base steel sheet diffuses into the Ni or Ni alloy coating or plating layer to form a solid solution phase or an intermetallic compound, and a Ni diffusion region is formed on the surface layer of the member.

Here, if the thickness of the Ni diffusion region is less than 0.5 μm, it is not possible to obtain satisfactory resistance to resistance welding cracking and delayed fracture resistance. Therefore, the thickness of the Ni diffusion region in the surface layer of the member is 0.5 μm or more. Note that the upper limit of the thickness of the Ni diffusion region is preferably 20 μm.

For example, when a hot-dip galvanizing layer, a galvannealing layer, a Zn electroplating layer, or the like which contains Ni is heated, an FeZn solid solution phase in which Zn is dissolved in Fe, a ZnFe intermetallic compound, a ZnO layer in the surface layer, and the like are formed, while at the same time a Ni-containing solid solution layer in which a coating or plating layer component is dissolved in Fe and an intermetallic compound mainly made of ZnNi are formed.

Next, a preferred method for manufacturing the cold-rolled steel sheet for hot pressing according to the present disclosure will be described. In the present disclosure, in the production of the above-described cold-rolled steel sheet, at first, a steel material (slab) having the above-described predetermined composition is hot rolled under a condition of a finisher delivery temperature of 850° C. to 1000° C. to obtain a hot-rolled steel sheet. After the hot rolling, the steel sheet is cooled to a coiling temperature of 500° C. or lower at an average cooling rate of 40° C./s or higher.

Then, the coiled hot-rolled steel sheet is pickled and cold rolled to obtain a cold-rolled steel sheet. Then, the cold-rolled steel sheet is subjected to a first annealing treatment whereby it is heated to a temperature range of 850° C. or higher, then cooled to a temperature range of 350° C. to 450° C., held for 300 seconds or more in temperature range of 350° C. to 450° C., and then cooled to room temperature. Then, the steel sheet is subjected to a second annealing treatment whereby it is heated to a temperature range of 720° C. to 820° C. at an average heating rate of 3° C./s to 30° C./s, held for 15 seconds or more in the temperature range of 720° C. to 820° C., and then cooled to a cooling end temperature range of 600° C. or lower at an average cooling rate of 5° C./s or higher.

Then, a Ni or Ni-alloy coating or plating treatment is applied to the surface of the steel sheet.

Hereinafter, the above manufacturing method will be described in detail for each step.

[Heating]

For a steel slab as a raw material after being cast, it is preferable to start hot rolling either at 1150° C. to 1270° C. directly after casting without reheating or after reheating to 1150° C. to 1270° C. Under preferred conditions for hot rolling, at first, a steel slab is hot rolled at a hot rolling start temperature of 1150° C. to 1270° C.

In the present disclosure, after a steel slab is prepared, in addition to a conventional method in which a steel slab is first cooled to room temperature and then reheated, an energy saving process is also applicable without any problem, such as hot direct rolling or direct rolling, in which a steel slab is charged into a heating furnace as a warm slab without being cooled, in which a steel slab is rolled immediately after heat retention, or in which a steel slab is rolled directly after casting.

[Hot Rolling]

Finisher Delivery Temperature: 850° C. to 1000° C.

The hot rolling needs to be finished in the austenite single phase region in order to improve the resistance to resistance welding cracking by increasing the uniformity of the microstructure of the steel sheet and reducing the anisotropy of the material property. Therefore, the finisher delivery temperature is 850° C. or higher. On the other hand, when the finisher delivery temperature exceeds 1000° C., the hot-rolled microstructure becomes coarse, and the resistance to resistance welding cracking and the delayed fracture resistance after annealing deteriorate. Therefore, the finisher delivery temperature is 1000° C. or lower.

The rolling reduction in hot rolling is not particularly limited, and hot rolling may be performed with a rolling reduction of 90% or more according to a conventional method.

Cooling: Cooling to 500° C. or Lower at an Average Cooling Rate of 40° C./s or higher The austenite undergoes ferrite transformation during the cooling process after the end of the hot rolling. However, since the ferrite coarsens at high temperatures, quenching is performed after the end of the hot rolling to homogenize the microstructure as much as possible, while at the same time suppressing generation of Nb-based precipitates. Accordingly, cooling is performed to 500° C. or lower at an average cooling rate of 40° C./s or higher. If the average cooling rate is lower than 40° C./s, the ferrite is coarsened, and the microstructure of the hot-rolled steel sheet becomes inhomogeneous, leading to a reduction in the resistance to resistance welding cracking and the delayed fracture resistance. On the other hand, if the cooling end temperature exceeds 500° C., coarse Nb-based precipitates are formed, and the desired number density of Nb-based precipitates can not be obtained after hot pressing. Note that the upper limit of the average cooling rate is preferably about 200° C./s.

[Coiling]

Coiling Temperature: 500° C. or Lower

If the coiling temperature is higher than 500° C., coarse Nb-based precipitates are formed in the microstructure of the hot-rolled steel sheet, and the desired number density of Nb-based precipitates can not be obtained after hot pressing, with the result that the resistance to resistance welding cracking and the delayed fracture resistance decrease. To avoid this, it is important to perform coiling in a temperature range with a bainite single phase. Therefore, in the present disclosure, the upper limit of the coiling temperature is 500° C. It is preferably 480° C. or lower. The lower limit of the coiling temperature is not particularly specified, yet if the coiling temperature is too low, hard martensite is excessively formed to increase the cold rolling load. Therefore, the lower limit is preferably 300° C. or higher.

[Pickling]

After the hot rolling, pickling is performed to remove scale from the surface of the hot-rolled sheet. The pickling treatment is not particularly limited and may be carried out according to a conventional method.

[Cold Rolling]

Cold rolling is performed to roll a steel sheet into a cold-rolled sheet having a predetermined thickness. The cold rolling is not particularly limited and may be carried out according to a conventional method.

[Annealing]

This annealing step is performed for the purpose of advancing recrystallization after cold rolling, controlling Nb-based precipitates after hot pressing, and refining the microstructure of the steel sheet. To this end, it is necessary to perform annealing separately in two stages of first annealing and second annealing.

In the first annealing, the steel sheet is heated to a temperature range of 850° C. or higher, cooled to a temperature range of 350° C. to 450° C., held for 300 seconds or longer in the temperature range of 350° C. to 450° C., and then cooled to room temperature.

Then, in the second annealing, the steel sheet is heated to a temperature range of 720° C. to 820° C. at an average heating rate of 3° C./s to 30° C./s, held for 15 seconds or more in the temperature range of 720° C. to 820° C., and then cooled to a cooling end temperature range of 600° C. or lower at an average cooling rate of 5° C./s or higher.

[First Annealing]

Heating Temperature: 850° C. or Higher

In the first annealing, it is important to first obtain a bainite single phase, whereby microstructure grains of the steel sheet are refined in the second annealing. To obtain a bainite single phase in the first annealing, it is necessary to form an austenite single phase beforehand. Therefore, the heating temperature is 850° C. or higher. If the heating temperature is lower than 850° C., ferrite is undesirably formed.

Cooling temperature: 350° C. to 450° C., Holding time: 300 seconds or more

After the above heating, cooling is performed to a temperature range of 350° C. to 450° C. The cooling rate is not particularly limited, yet is preferably 2° C./s or higher in order to suppress the formation of ferrite and pearlite. Then, the steel sheet is held for 300 seconds or more in a temperature range of 350° C. to 450° C. If the holding temperature is lower than 350° C. or the holding time is less than 300 seconds, martensite is excessively formed, and the effect of refining the microstructure grains of the steel sheet is reduced, making it impossible to secure the desired prior austenite grain size after hot pressing. On the other hand, if the holding temperature exceeds 450° C., pearlite is excessively formed, and again, the desired prior austenite grain size can not be secured after hot pressing. Note that the upper limit of the holding time is not particularly limited, yet is preferably within 1800 seconds.

[Second Annealing]

Average heating rate: 3° C./s to 30° C./s

The crystal grains after annealing can be refined by controlling the heating rate in the second annealing step. Excessively rapid heating makes it difficult for recrystallization to proceed, the upper limit of the average heating rate is set at 30° C./s. However, when the average heating rate is too low, ferrite and martensite grains become coarsened, and a predetermined average grain size can not be obtained. Therefore, the lower limit of the average heating rate is set at 3° C./s. It is preferably 5° C./s or higher.

Soaking Temperature: 720° C. to 820° C., Holding Time: 15 Seconds or More

The soaking temperature is set in a temperature range of a ferrite and austenite dual phase region. If the soaking temperature is below 720° C., the ferrite fraction increases and the desired volume fraction of martensite can not be obtained. Therefore, the lower limit of the soaking temperature is set at 720° C. Preferably, the soaking temperature is 740° C. or higher. On the other hand, if the soaking temperature is too high, in addition to the coarsening of crystal grains, Nb-based precipitates also coarsen. Therefore, the upper limit of the soaking temperature is set at 820° C. The soaking temperature is preferably 800° C. or lower. In the above-described soaking temperature range, a holding time of 15 seconds or more is necessary to advance recrystallization and to obtain a partial austenite transformation. Note that the upper limit is not particularly limited, yet is preferably within 600 seconds.

Average Cooling Rate: 5° C./s or Higher, Cooling End Temperature: 600° C. or Lower After the above-described soaking treatment (annealing treatment), it is necessary to perform cooling at an average cooling rate of 5° C./s or higher from the soaking temperature to a temperature range (cooling end temperature) of 600° C. or lower. If the average cooling rate is lower than 5° C./s, ferrite transformation proceeds during cooling, and the volume fraction of martensite in the cold-rolled steel sheet decreases and Nb-based precipitates become coarse, making it difficult to ensure the resistance to resistance welding cracking and the delayed fracture resistance. The upper limit of the average cooling rate is not particularly specified, yet is preferably 30° C./s or lower from the viewpoint of equipment and cost. In addition, when the cooling end temperature is higher than 600° C., pearlite is excessively formed, and a predetermined volume fraction in the microstructure of the steel sheet can not be obtained, causing deterioration of the delayed fracture resistance. The lower limit of the cooling end temperature is preferably 300° C.

[Coating or Plating]

The cold-rolled steel sheet for hot pressing according to the disclosure may be subjected to a coating or plating treatment to form a Ni or Ni-alloy coating or plating layer.

The coating or plating treatment is not limited at all, and any known hot-dip coating, electroplating, vapor deposition plating, and the like can be applied. In addition, after the coating or plating step, an alloying treatment may be performed. Any Ni or Ni-alloy coating or plating layer is suitable as long as it contains Ni, yet a Zn—Ni-alloy coating or plating layer is particularly preferable.

Temper rolling may also be carried out on the cold-rolled steel sheet. In this case, a preferred elongation ratio is 0.05% to 2.0%.

Next, hot pressing performed on the obtained cold-rolled steel sheet will be described.

The method and conditions of hot pressing are not limited in any way, and all known hot pressing methods can be applied. Although one example is given below, the present disclosure is not so limited.

For example, a cold-rolled steel sheet for hot pressing as a raw material may be heated to a temperature range of an $Ac_3$ transformation temperature to 1000° C. using an electric furnace, a gas furnace, an electric heating furnace, a far infrared heating furnace, or the like, held in this temperature range for 0 seconds to 600 seconds, transported to a press, and subjected to hot pressing in a temperature range of 550° C. to 800° C. The heating rate at the time of heating the cold-rolled steel sheet for hot pressing may be 3° C./s to 200° C./s.

Here, the $Ac_3$ transformation temperature can be determined by:

$$Ac_3 \text{ transformation temperature } (° C.) = 881 - 206C + 53Si - 15Mn - 20Ni - 1Cr - 27Cu + 41Mo$$

Where each element symbol represents the content by mass % of the corresponding element. For any element not contained, it is calculated as zero.

Examples

The following describes examples according to the disclosure.

The present disclosure is by no means limited by the examples described below, and can be implemented with appropriate modifications without departing from the spirit of the present disclosure. All such modifications are encompassed by the technical scope of the present disclosure.

Steels having the chemical compositions listed in Table 1 were prepared by steelmaking and cast into slabs, then heated to 1250° C., and then subjected to hot rolling under the conditions listed in Table 2 for the finisher delivery temperature (FDT). Then, each hot-rolled steel sheet was cooled to a coiling temperature (CT) at a first average cooling rate (Cooling Rate 1) listed in Table 2, and then wound in a coil form.

Then, each hot-rolled sheet thus obtained was pickled, and then cold rolled with a rolling reduction of 50% to obtain a cold-rolled sheet (sheet thickness: 1.4 mm).

Then, each cold-rolled steel sheet thus obtained was subjected to first and second annealing treatments under the conditions listed in Table 2 in a continuous annealing line (CAL) or a continuous galvanizing line (CGL), and hot-dip galvanized steel sheets (GI) containing Ni were obtained for those having passed through CGL. Note that some of the steel sheets having passed through CGL were subjected to a hot-dip galvanization treatment containing Ni, followed by an alloying treatment at 550° C., to obtain galvannealed steel sheets (GA) containing Ni. In addition, a hot-dip aluminum coating treatment containing Ni was performed to obtain a hot-dip aluminum coated steel sheet (AS). Furthermore, some were partially annealed in CAL, and zinc-nickel electroplated steel sheets (EZN) were obtained in an electrogalvanizing line (EGL). Table 2 lists the thickness of the above-mentioned coating layer.

For comparison, with respect to some of the samples, two-stage annealing was not performed after cold rolling, but single-stage annealing was performed according to a conventional method.

Then, hot pressing was performed on the obtained cold-rolled steel sheets (including those subjected to coating or plating) under the conditions listed in Table 3.

The mold used in the hot pressing had a punch width of 70 mm, a punch shoulder radius of 4 mm, and a die shoulder radius of 4 mm, and the forming depth was 30 mm. Heating of each cold-rolled steel sheet was performed in the atmosphere using either an infrared heating furnace or an atmosphere heating furnace depending on the heating rate. In addition, cooling after pressing was performed by combining sandwiching of each steel sheet between the punch and the die with air cooling on the die released from the sandwiching, and each steel sheet was cooled from the press (start) temperature to 150° C. At this time, the cooling rate was adjusted by changing the holding time of the punch at the bottom dead center in a range of 1 second to 60 seconds.

A JIS No. 5 tensile test specimen was collected from the position of the hat bottom portion of each hot-pressed member thus obtained, and a tensile test was performed according to JIS Z 2241 to measure the tensile strength (TS).

For resistance welding cracking test, resistance welding (spot welding) was performed using a test specimen cut into 50 mm×150 mm from the hat bottom portion of each obtained hot-pressed member. As a sheet combination to be welded, a sheet combination in which the hot-pressed member and a galvannealed steel sheet of 980 MPa grade are stacked was used. The welding was performed by resistance spot welding using a resistance welding machine of servo-motor pressure type at single phase alternating current (50 Hz) attached to a welding gun on a sheet combination in which two steel sheets were stacked, with the sheet combination inclined by 4°. The welding conditions were a pressure of 5.0 kN and a hold time of 0.36 seconds. The welding current and welding time were adjusted such that the nugget diameter was 6.0 mm. After welding, the test specimen was cut in half, and a cross section parallel to the thickness direction was observed under an optical microscope, and those with no cracks of 0.15 mm or more were judged as being excellent in resistance to resistance welding cracking ("Good") and those with cracks of 0.15 mm or more as being poor in resistance to resistance welding cracking ("Poor").

The delayed fracture resistance after resistance welding was investigated as follows. Using two sheets of test specimens cut into a size of 50 mm×150 mm from the hat bottom of each obtained hot-pressed member, a steel sheet of 50 mm×50 mm size (a spacer with a sheet thickness of 0.5 mm) was squeezed between the ends of the test specimens, the spacer was temporarily fixed by resistance welding, and the central portions of the test specimens were resistance welded. That is, the welding was performed by resistance spot welding using a resistance welding machine of servo-motor pressure type at single phase alternating current (50 Hz) attached to a welding gun on a sheet combination in which two steel sheets were stacked, with the sheet combination in horizontal position. The welding was performed under a set of conditions including a pressure of 5.0 kN and a hold time of 0.36 seconds. The welding current and the welding time were adjusted such that the nugget diameter was 6.0 mm. After welding, the test specimens were immersed in hydrochloric acid at pH 3 for 96 hours, and then each test specimen was cut in half, and a cross section parallel to the thickness direction was observed under an optical microscope. The delayed fracture resistance was evaluated as "Good" if no crack was observed inside the nugget or "Poor" if any cracks were observed.

To determine the volume fraction of martensite of the cold-rolled steel sheet after being annealed and the member after being subjected to hot pressing, a cross section parallel to the rolling direction and the thickness direction of the steel sheet was polished, treated by corrosion with 3 vol % nital, and observed under a scanning electron microscope (SEM) at 5000 times magnification, and the area ratio was measured by a point count method (in accordance with ASTM E562-83 (1988)), and the measured area ratio was used as the volume fraction.

Further, to determine the grain size of Nb-based precipitates, a cross section parallel to the thickness direction was observed at 10 locations of 0.5 μm×0.5 μm under a transmission electron microscope (TEM) at 50000 times magnification, and the equivalent circle diameter was calculated using Image-Pro available from Media Cybernetics with a lower limit of 0.005 μm to determine the grain size. To determine the number of Nb-based precipitates having a grain size of less than 0.08 μm, the cross section was observed at 10 locations of 0.5 μm×0.5 μm under a transmission electron microscope (TEM) at 50000 times magnification, and the average number density of these 10 locations was obtained. In this method, it was possible to count Nb-based precipitates having a grain size of 0.005 μm or more.

To determine the prior austenite average grain size in each hot-pressed member, a cross section parallel to the thickness direction of each member was polished, treated by corrosion with 3 vol % nital, and observed under a scanning electron microscope (SEM) at 3000 times magnification, and using Image-Pro available from Media Cybernetics, the circle equivalent diameters of prior austenite grains were calculated, and the values were averaged.

To determine the thickness of the Ni diffusion region in the surface layer of each hot-pressed member, polishing a cross section parallel to the thickness direction of each member after being subjected to hot pressing was polished, the element distribution on the surface layer was mapped for Fe and Ni using an electron probe microanalyzer (EPMA), and those parts in which both Fe and Ni were detected were taken as Ni diffusion regions and the lengths (thicknesses) of these regions were averaged.

For each cold-rolled steel sheet after being subjected to annealing, the volume fraction of martensite, the average grain size of martensite, the volume fraction of ferrite, and the average aspect ratio of ferrite grains were determined as follows.

To determine the volume fractions of ferrite and martensite in each cold-rolled steel sheet after being subjected to annealing, a cross section parallel to the rolling direction of the steel sheet and parallel to the thickness direction was polished, treated by corrosion with 3 vol % nital, and observed under a scanning electron microscope (SEM) at 5000 times magnification, and the area ratio was measured by a point count method (in accordance with ASTM E562-83 (1988)), and the measured area ratio was used as the volume fraction.

To determine the average grain size of martensite, using Image-Pro available from Media Cybernetics, micrographs in which crystal grains of martensite had been identified in advance were captured from the microstructural micrographs of each steel sheet (taken at 10 locations of 20 μm×20 μm at 5000 times magnification) to determine the area of each phase. The equivalent circular diameters were then calculated, the results were averaged, and the average was used as the average grain size. Regarding the aspect ratio of ferrite, the aspect ratio (the major axis length/the minor axis length) of each grain was determined from the above-mentioned micrographs, and the results were averaged.

The microstructures of the cold-rolled steel sheets and the hot-pressed members thus obtained are listed in Table 4. In addition, Table 5 lists the measurement results of the tensile properties, the resistance to resistance welding cracking, and the delayed fracture resistance after resistance welding of the hot-pressed members.

TABLE 1

| Steel ID | Chemical composition (mass %) | | | | | | | | | | | Remarks |
|---|---|---|---|---|---|---|---|---|---|---|---|---|
| | C | Si | Mn | P | S | Al | N | Nb | Ti | B | Others | |
| A | 0.34 | 0.34 | 1.77 | 0.01 | 0.001 | 0.03 | 0.002 | 0.034 | 0.025 | 0.0015 | — | Conforming steel |
| B | 0.33 | 0.22 | 1.55 | 0.01 | 0.001 | 0.03 | 0.002 | 0.012 | 0.022 | 0.0020 | Cr: 0.20, Sb: 0.009 | Conforming steel |
| C | 0.29 | 1.11 | 1.49 | 0.01 | 0.001 | 0.02 | 0.003 | 0.021 | 0.025 | 0.0021 | Mo: 0.24, Cu: 0.15, Sn: 0.08, Zr: 0.03 | Conforming steel |
| D | 0.32 | 0.64 | 1.78 | 0.02 | 0.001 | 0.02 | 0.002 | 0.029 | 0.021 | 0.0019 | V: 0.02, Co: 0.05, Zn: 0.03, W: 0.02 | Conforming steel |
| E | 0.38 | 0.22 | 1.44 | 0.01 | 0.002 | 0.03 | 0.002 | 0.019 | 0.019 | 0.0023 | Ni: 0.21, Ta: 0.03, Ca: 0.001 | Conforming steel |
| F | 0.31 | 0.33 | 1.73 | 0.01 | 0.002 | 0.03 | 0.002 | 0.022 | 0.025 | 0.0019 | Ca: 0.001, Mg: 0.001, REM: 0.002 | Conforming steel |
| G | 0.21 | 0.23 | 1.33 | 0.01 | 0.001 | 0.03 | 0.003 | 0.024 | 0.022 | 0.0021 | — | Comparative steel |
| H | 0.48 | 0.34 | 1.88 | 0.01 | 0.001 | 0.03 | 0.002 | 0.021 | 0.031 | 0.0022 | — | Comparative steel |
| I | 0.32 | 0.54 | 4.32 | 0.01 | 0.001 | 0.03 | 0.002 | 0.021 | 0.021 | 0.0025 | — | Comparative steel |
| J | 0.31 | 0.25 | 2.15 | 0.01 | 0.001 | 0.02 | 0.003 | 0.000 | 0.021 | 0.0015 | — | Comparative steel |

TABLE 2

| Specimen No. | Steel ID | Hot rolling | | | First annealing | | | Second annealing | | | | | | Thickness of coating or plating (μm) | Remarks |
|---|---|---|---|---|---|---|---|---|---|---|---|---|---|---|---|
| | | FDT °C. | Cooling rate 1 °C./s | CT °C. | Heating temp. °C. | Holding temp. °C. | Holding time s | Average heating rate °C./s | Soaking temp. °C. | Holding time s | Average cooling rate °C./s | Cooling end temp. °C. | Coating or Plating | | |
| 1 | A | 900 | 100 | 500 | 870 | 400 | 500 | 10 | 760 | 180 | 6 | 500 | EZN | 10 | Example |
| 2 | B | 900 | 100 | 500 | 870 | 400 | 500 | 10 | 760 | 180 | 6 | 500 | EZN | 8 | Example |
| 3 | C | 900 | 100 | 500 | 870 | 400 | 500 | 10 | 760 | 180 | 6 | 500 | EZN | 10 | Example |
| 4 | D | 900 | 100 | 500 | 870 | 400 | 500 | 10 | 760 | 180 | 6 | 500 | EZN | 11 | Example |
| 5 | E | 900 | 100 | 500 | 870 | 400 | 500 | 10 | 760 | 180 | 6 | 500 | EZN | 5 | Example |
| 6 | F | 900 | 100 | 500 | 870 | 400 | 500 | 10 | 760 | 180 | 6 | 500 | EZN | 10 | Example |
| 7 | A | 900 | 100 | 500 | 870 | 400 | 500 | 10 | 760 | 180 | 6 | 500 | AS | 10 | Example |
| 8 | B | 900 | 100 | 500 | 870 | 400 | 500 | 10 | 760 | 180 | 6 | 500 | GI | 15 | Example |
| 9 | C | 900 | 100 | 500 | 870 | 400 | 500 | 10 | 760 | 180 | 6 | 500 | GA | 15 | Example |
| 10 | D | 900 | 100 | 500 | 870 | 400 | 500 | 10 | 760 | 180 | 6 | 500 | AS | 12 | Example |
| 11 | E | 900 | 100 | 500 | 870 | 400 | 500 | 10 | 760 | 180 | 6 | 500 | GI | 20 | Example |
| 12 | F | 900 | 100 | 500 | 870 | 400 | 500 | 10 | 760 | 180 | 6 | 500 | GA | 10 | Example |
| 13 | A | 900 | 100 | 500 | 870 | 400 | 500 | 10 | 760 | 180 | 6 | 500 | EZN | 10 | Example |
| 14 | A | 900 | 100 | 500 | 870 | 400 | 500 | 10 | 760 | 180 | 6 | 500 | EZN | 15 | Example |
| 15 | A | 900 | 100 | 500 | 870 | 400 | 500 | 10 | 760 | 180 | 6 | 500 | EZN | 11 | Example |
| 16 | A | 900 | 100 | 500 | 870 | 400 | 500 | 10 | 760 | 180 | 6 | 500 | EZN | 10 | Example |
| 17 | A | 900 | 100 | 500 | 870 | 400 | 500 | 10 | 760 | 180 | 6 | 500 | EZN | 20 | Example |
| 18 | A | 900 | 100 | 500 | 870 | 400 | 500 | 10 | 760 | 180 | 6 | 500 | EZN | 10 | Example |
| 19 | A | 900 | 100 | 500 | 870 | 400 | 500 | 10 | 760 | 180 | 6 | 500 | EZN | 7 | Example |
| 20 | A | 900 | 100 | 500 | 870 | 400 | 500 | 10 | 760 | 180 | 6 | 500 | EZN | 10 | Example |
| 21 | A | 900 | 100 | 500 | 870 | 400 | 500 | 10 | 760 | 180 | 6 | 500 | EZN | 7 | Example |
| 22 | A | 900 | 100 | 500 | 870 | 400 | 500 | 10 | 760 | 180 | 6 | 500 | EZN | 12 | Example |

TABLE 2-continued

| Specimen No. | Steel ID | Hot rolling | | | First annealing | | | Second annealing | | | | | | Thickness of coating or plating (μm) | Remarks |
|---|---|---|---|---|---|---|---|---|---|---|---|---|---|---|---|
| | | FDT °C. | Cooling rate 1 °C./s | CT °C. | Heating temp. °C. | Holding temp. °C. | Holding time s | Average heating rate °C./s | Soaking temp. °C. | Holding time s | Average cooling rate °C./s | Cooling end temp. °C. | Coating or Plating | | |
| 23 | A | 900 | 100 | 500 | 870 | 400 | 500 | 10 | 760 | 180 | 6 | 500 | EZN | 10 | Example |
| 24 | A | 900 | <u>10</u> | 500 | 870 | 400 | 500 | 10 | 760 | 180 | 6 | 500 | EZN | 7 | Comparative example |
| 25 | A | 900 | 100 | <u>700</u> | 870 | 400 | 500 | 10 | 760 | 180 | 6 | 500 | EZN | 10 | Comparative example |
| 26 | A | 900 | 100 | 500 | <u>700</u> | 400 | 500 | 10 | 760 | 180 | 6 | 500 | EZN | 10 | Comparative example |
| 27 | A | 900 | 100 | 500 | 870 | <u>200</u> | 500 | 10 | 760 | 180 | 6 | 500 | EZN | 12 | Comparative example |
| 28 | A | 900 | 100 | 500 | 870 | <u>600</u> | 500 | 10 | 760 | 180 | 6 | 500 | EZN | 10 | Comparative example |
| 29 | A | 900 | 100 | 500 | 870 | 400 | <u>10</u> | 10 | 760 | 180 | 6 | 500 | EZN | 10 | Comparative example |
| 30 | A | 900 | 100 | 500 | 870 | 400 | 500 | <u>1</u> | 760 | 180 | 6 | 500 | EZN | 10 | Comparative example |
| 31 | B | 900 | 100 | 500 | 870 | 400 | 500 | 10 | <u>600</u> | 180 | 6 | 500 | EZN | 15 | Comparative example |
| 32 | B | 900 | 100 | 500 | 870 | 400 | 500 | 10 | <u>950</u> | 180 | 6 | 500 | EZN | 12 | Comparative example |
| 33 | B | 900 | 100 | 500 | 870 | 400 | 500 | 10 | 760 | <u>5</u> | 6 | 500 | EZN | 10 | Comparative example |
| 34 | B | 900 | 100 | 500 | 870 | 400 | 500 | 10 | 760 | 180 | <u>1</u> | 500 | EZN | 13 | Comparative example |
| 35 | B | 900 | 100 | 500 | 870 | 400 | 500 | 10 | 760 | 180 | 6 | <u>700</u> | EZN | 10 | Comparative example |
| 36 | A | 900 | 100 | 500 | 870 | 400 | 500 | 10 | 760 | 180 | 6 | 500 | <u>CR</u> | — | Comparative example |
| 37 | <u>G</u> | 900 | 100 | 500 | 870 | 400 | 500 | 10 | 760 | 180 | 6 | 500 | EZN | 10 | Comparative example |
| 38 | <u>H</u> | 900 | 100 | 500 | 870 | 400 | 500 | 10 | 760 | 180 | 6 | 500 | EZN | 10 | Comparative example |
| 39 | <u>I</u> | 900 | 100 | 500 | 870 | 400 | 500 | 10 | 760 | 180 | 5 | 500 | EZN | 15 | Comparative example |
| 40 | <u>J</u> | 900 | 100 | 500 | 870 | 400 | 500 | 10 | 760 | 180 | 6 | 500 | EZN | 8 | Comparative example |
| 41 | A | 900 | 100 | 500 | One annealing treatment with heating rate: 10° C., holding temp.: 760° C., holding time: 180 s, cooling rate: 6° C./s, and cooling end temp.: 500° C. | | | | | | | | EZN | 10 | Comparative example |
| 42 | B | 900 | 100 | 500 | One annealing treatment with heating rate: 10° C., holding temp.: 760° C., holding time: 180 s, cooling rate: 6° C./s, and cooling end temp.: 500° C. | | | | | | | | EZN | 11 | Comparative example |

Underlined if outside the scope of the disclosure.

TABLE 3

| Specimen No. | Steel ID | Hot pressing Heating rate °C./s | Heating temp. °C. | Holding time s | Hot pressing temp. °C. | Cooling rate up to 150° C. °C./s | Remarks |
|---|---|---|---|---|---|---|---|
| 1 | A | 5 | 900 | 60 | 700 | 100 | Example |
| 2 | B | 5 | 900 | 60 | 700 | 100 | Example |
| 3 | C | 5 | 900 | 60 | 700 | 100 | Example |
| 4 | D | 5 | 900 | 60 | 700 | 100 | Example |
| 5 | E | 5 | 900 | 60 | 700 | 100 | Example |
| 6 | F | 5 | 900 | 60 | 700 | 100 | Example |
| 7 | A | 5 | 900 | 60 | 700 | 100 | Example |
| 8 | B | 5 | 900 | 60 | 700 | 100 | Example |
| 9 | C | 5 | 900 | 60 | 700 | 100 | Example |
| 10 | D | 5 | 900 | 60 | 700 | 100 | Example |
| 11 | E | 5 | 900 | 60 | 700 | 100 | Example |
| 12 | F | 5 | 900 | 60 | 700 | 100 | Example |
| 13 | A | 3 | 900 | 60 | 700 | 100 | Example |
| 14 | A | 90 | 900 | 60 | 700 | 100 | Example |
| 15 | A | 180 | 900 | 60 | 700 | 100 | Example |
| 16 | A | 5 | 830 | 60 | 700 | 100 | Example |
| 17 | A | 5 | 950 | 60 | 700 | 100 | Example |
| 18 | A | 5 | 900 | 5 | 700 | 100 | Example |
| 19 | A | 5 | 900 | 300 | 700 | 100 | Example |
| 20 | A | 5 | 900 | 60 | 650 | 100 | Example |
| 21 | A | 5 | 900 | 60 | 750 | 100 | Example |
| 22 | A | 5 | 900 | 60 | 700 | 50 | Example |
| 23 | A | 5 | 900 | 60 | 700 | 300 | Example |
| 24 | A | 5 | 900 | 60 | 700 | 100 | Comparative example |
| 25 | A | 5 | 900 | 60 | 700 | 100 | Comparative example |
| 26 | A | 5 | 900 | 60 | 700 | 100 | Comparative example |
| 27 | A | 5 | 900 | 60 | 700 | 100 | Comparative example |
| 28 | A | 5 | 900 | 60 | 700 | 100 | Comparative example |
| 29 | A | 5 | 900 | 60 | 700 | 100 | Comparative example |
| 30 | A | 5 | 900 | 60 | 700 | 100 | Comparative example |
| 31 | B | 5 | 900 | 60 | 700 | 100 | Comparative example |
| 32 | B | 5 | 900 | 60 | 700 | 100 | Comparative example |
| 33 | B | 5 | 900 | 60 | 700 | 100 | Comparative example |
| 34 | B | 5 | 900 | 60 | 700 | 100 | Comparative example |
| 35 | B | 5 | 900 | 60 | 700 | 100 | Comparative example |
| 36 | A | 5 | 900 | 60 | 700 | 101 | Comparative example |
| 37 | G | 5 | 900 | 60 | 700 | 100 | Comparative example |
| 38 | H | 5 | 900 | 60 | 700 | 100 | Comparative example |
| 39 | I | 5 | 900 | 60 | 700 | 100 | Comparative example |
| 40 | J | 5 | 900 | 60 | 700 | 100 | Comparative example |
| 41 | A | 5 | 900 | 60 | 700 | 100 | Comparative example |
| 42 | B | 5 | 900 | 60 | 700 | 100 | Comparative example |

TABLE 4

| | Micro structure of cold-rolled steel sheet | | | | | Micro structure of hot-pressed member | | | | |
|---|---|---|---|---|---|---|---|---|---|---|
| | Ferrite | | Martensite | | Nb-based precipitates smaller than | Martensite | Prior austenite | Nb-based precipitates smaller than | Ni diffusion region | |
| Specimen No. | Aspect ratio | Volume fraction (%) | Average grain size (μm) | Volume fraction (%) | 0.08 μm (counts/100 μm$^2$) | Volume fraction (%) | Average grain size (μm) | 0.08 μm (counts/100 μm$^2$) | (μm) | Remarks |
| 1 | 1.8 | 64 | 5 | 15 | 18 | 98 | 5 | 15 | 8 | Example |
| 2 | 1.7 | 68 | 5 | 15 | 17 | 99 | 6 | 14 | 7 | Example |
| 3 | 2.1 | 72 | 5 | 14 | 16 | 98 | 6 | 13 | 7 | Example |
| 4 | 2.0 | 59 | 4 | 12 | 18 | 99 | 7 | 16 | 7 | Example |
| 5 | 1.8 | 67 | 4 | 21 | 16 | 99 | 6 | 13 | 8 | Example |
| 6 | 1.9 | 54 | 6 | 12 | 18 | 99 | 6 | 15 | 9 | Example |
| 7 | 2.4 | 68 | 5 | 14 | 17 | 98 | 7 | 14 | 8 | Example |
| 8 | 1.8 | 65 | 5 | 15 | 18 | 98 | 6 | 15 | 11 | Example |
| 9 | 1.9 | 67 | 5 | 13 | 22 | 100 | 5 | 14 | 8 | Example |
| 10 | 2.1 | 65 | 6 | 13 | 19 | 98 | 6 | 16 | 7 | Example |
| 11 | 2.3 | 62 | 5 | 15 | 20 | 99 | 6 | 17 | 8 | Example |
| 12 | 2.1 | 70 | 4 | 14 | 18 | 99 | 5 | 15 | 10 | Example |
| 13 | 1.8 | 65 | 3 | 13 | 16 | 99 | 6 | 13 | 8 | Example |
| 14 | 1.9 | 64 | 5 | 13 | 18 | 100 | 5 | 15 | 9 | Example |
| 15 | 1.7 | 68 | 5 | 18 | 18 | 98 | 6 | 15 | 8 | Example |
| 16 | 2.1 | 74 | 5 | 13 | 17 | 99 | 6 | 13 | 8 | Example |

TABLE 4-continued

| | Micro structure of cold-rolled steel sheet | | | | | Micro structure of hot-pressed member | | | | |
|---|---|---|---|---|---|---|---|---|---|---|
| | Ferrite | | | Martensite | Nb-based precipitates smaller than | Martensite | Prior austenite | Nb-based precipitates smaller than | Ni | |
| Specimen No. | Aspect ratio | Volume fraction (%) | Average grain size (μm) | Volume fraction (%) | 0.08 μm (counts/ 100 μm²) | Volume fraction (%) | Average grain size (μm) | 0.08 μm (counts/ 100 μm²) | diffusion region (μm) | Remarks |
| 17 | 2.0 | 78 | 6 | 15 | 16 | 98 | 7 | 13 | 7 | Example |
| 18 | 1.8 | 79 | 5 | 15 | 18 | 99 | 6 | 15 | 7 | Example |
| 19 | 1.9 | 70 | 5 | 14 | 16 | 99 | 5 | 13 | 7 | Example |
| 20 | 2.4 | 74 | 4 | 12 | 18 | 99 | 5 | 15 | 8 | Example |
| 21 | 1.8 | 67 | 4 | 13 | 17 | 98 | 6 | 14 | 9 | Example |
| 22 | 1.9 | 54 | 6 | 12 | 20 | 99 | 4 | 17 | 8 | Example |
| 23 | 2.1 | 68 | 5 | 14 | 18 | 99 | 5 | 14 | 11 | Example |
| 24 | 2.7 | 65 | 5 | 15 | 9 | 99 | 8 | 3 | 7 | Comparative example |
| 25 | 2.6 | 67 | 8 | 13 | 8 | 100 | 8 | 4 | 7 | Comparative example |
| 26 | 3.1 | 65 | 8 | 13 | 13 | 98 | 8 | 9 | 8 | Comparative example |
| 27 | 1.9 | 62 | 8 | 15 | 14 | 99 | 8 | 8 | 6 | Comparative example |
| 28 | 2.1 | 79 | 7 | 22 | 13 | 98 | 8 | 3 | 8 | Comparative example |
| 29 | 2.6 | 70 | 8 | 18 | 12 | 99 | 8 | 9 | 9 | Comparative example |
| 30 | 2.6 | 74 | 8 | 13 | 8 | 98 | 8 | 4 | 8 | Comparative example |
| 31 | 2.9 | 88 | — | 0 | 13 | 99 | 9 | 8 | 6 | Comparative example |
| 32 | 1.8 | 34 | 8 | 51 | 5 | 98 | 9 | 2 | 7 | Comparative example |
| 33 | 2.8 | 65 | 8 | 14 | 11 | 98 | 8 | 9 | 7 | Comparative example |
| 34 | 2.9 | 67 | 3 | 2 | 8 | 99 | 8 | 4 | 6 | Comparative example |
| 35 | 2.0 | 65 | 5 | 13 | 5 | 98 | 5 | 4 | 6 | Comparative example |
| 36 | 1.9 | 62 | 5 | 15 | 12 | 99 | 7 | 8 | 0 | Comparative example |
| 37 | 2.1 | 67 | 5 | 13 | 18 | 99 | 6 | 15 | 7 | Comparative example |
| 38 | 2.1 | 68 | 8 | 15 | 16 | 99 | 8 | 13 | 7 | Comparative example |
| 39 | 1.8 | 38 | 7 | 43 | 11 | 99 | 8 | 7 | 6 | Comparative example |
| 40 | 2.1 | 68 | 6 | 18 | 0 | 98 | 8 | 0 | 7 | Comparative example |
| 41 | 2.8 | 70 | 8 | 12 | 5 | 99 | 8 | 2 | 6 | Comparative example |
| 42 | 2.6 | 68 | 7 | 12 | 6 | 99 | 9 | 4 | 7 | Comparative example |

Underlined if outside the scope of the disclosure.

TABLE 5

| Specimen No. | Tensile strength TS (MPa) | Resistance to resistance welding cracking | Delayed fracture resistance | Remarks |
|---|---|---|---|---|
| 1 | 1833 | Good | Good | Example |
| 2 | 1832 | Good | Good | Example |
| 3 | 1797 | Good | Good | Example |
| 4 | 1837 | Good | Good | Example |
| 5 | 1974 | Good | Good | Example |
| 6 | 1820 | Good | Good | Example |
| 7 | 1802 | Good | Good | Example |
| 8 | 1820 | Good | Good | Example |
| 9 | 1821 | Good | Good | Example |
| 10 | 1821 | Good | Good | Example |
| 11 | 1988 | Good | Good | Example |
| 12 | 1833 | Good | Good | Example |
| 13 | 1801 | Good | Good | Example |
| 14 | 1813 | Good | Good | Example |
| 15 | 1841 | Good | Good | Example |
| 16 | 1833 | Good | Good | Example |
| 17 | 1834 | Good | Good | Example |
| 18 | 1843 | Good | Good | Example |
| 19 | 1834 | Good | Good | Example |
| 20 | 1832 | Good | Good | Example |
| 21 | 1822 | Good | Good | Example |
| 22 | 1853 | Good | Good | Example |
| 23 | 1817 | Good | Good | Example |
| 24 | 1829 | Poor | Poor | Comparative example |

TABLE 5-continued

| Specimen No. | Tensile strength TS (MPa) | Resistance to resistance welding cracking | Delayed fracture resistance | Remarks |
|---|---|---|---|---|
| 25 | 1831 | Poor | Poor | Comparative example |
| 26 | 1823 | Poor | Poor | Comparative example |
| 27 | 1833 | Poor | Poor | Comparative example |
| 28 | 1823 | Poor | Poor | Comparative example |
| 29 | 1809 | Poor | Poor | Comparative example |
| 30 | 1827 | Poor | Poor | Comparative example |
| 31 | 1829 | Poor | Poor | Comparative example |
| 32 | 1841 | Poor | Poor | Comparative example |
| 33 | 1841 | Poor | Poor | Comparative example |
| 34 | 1825 | Poor | Poor | Comparative example |
| 35 | 1824 | Poor | Poor | Comparative example |
| 36 | 1833 | Poor | Poor | Comparative example |
| 37 | <u>1511</u> | Good | Poor | Comparative example |
| 38 | 2214 | Poor | Poor | Comparative example |
| 39 | 1809 | Poor | Poor | Comparative example |
| 40 | 1802 | Poor | Poor | Comparative example |
| 41 | 1835 | Poor | Poor | Comparative example |
| 42 | 1849 | Poor | Poor | Comparative example |

Underlined if outside of the scope of the disclosure.

Underlined if outside of the scope of the disclosure.

As can be seen from Table 5, all of our examples in which the chemical compositions and the microstructures of hot-pressed members satisfy the appropriate ranges of the present disclosure have excellent resistance to resistance welding cracking and excellent delayed fracture resistance after resistance welding, not to mention high tensile strength.

The invention claimed is:

1. A hot-pressed member comprising:
a steel chemical composition containing, by mass %, C: 0.28% or more and less than 0.42%, Si: 0.05% or more and 1.5% or less, Mn: 1.0% or more and 3.0% or less, P: 0.05% or less, S: 0.005% or less, Al: 0.01% or more and 0.50% or less, N: 0.005% or less, Nb: 0.001% or more and 0.10% or less, Ti: 0.001% or more and 0.15% or less, and B: 0.0002% or more and 0.0040% or less, with the balance being Fe and inevitable impurities;
a microstructure in which
a prior austenite average grain size is 7 μm or less, a volume fraction of martensite is 90% or more, and at least 5 Nb-based precipitates having a grain size of less than 0.08 μm are present on average per 100 μm$^2$ of a cross section parallel to a thickness direction of the member within a range of 100 μm in the thickness direction from a surface of the member;
a Ni diffusion region having a thickness of 0.5 μm or more present in a surface layer of the member; and
a tensile strength of 1780 MPa or more.

2. The hot-pressed member according to claim 1, wherein the steel chemical composition further contains, by mass %, at least one selected from the group consisting of Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

3. A cold-rolled steel sheet for hot pressing, comprising:
a chemical composition containing, by mass %, C: 0.28% or more and less than 0.42%, Si: 0.05% or more and 1.5% or less, Mn: 1.0% or more and 3.0% or less, P: 0.05% or less, S: 0.005% or less, Al: 0.01% or more and 0.50% or less, N: 0.005% or less, Nb: 0.001% or more and 0.10% or less, Ti: 0.001% or more and 0.15% or less, and B: 0.0002% or more and 0.0040% or less, with the balance being Fe and inevitable impurities,
a microstructure which contains 20% or more by volume fraction of ferrite having an average grain aspect ratio of 2.5 or less, 10% or more by volume fraction of martensite having an average grain size of 6 μm or less, and at least 10 Nb-based precipitates having a grain size of less than 0.08 μm present on average per 100 μm$^2$ of a cross section parallel to a thickness direction of the steel sheet within a range of 100 μm in the thickness direction from a surface of the steel sheet; and
a Ni or Ni alloy coating or plating layer having a thickness of 0.5 μm or more on the surface of the steel sheet.

4. The cold-rolled steel sheet for hot pressing according to claim 3, wherein the chemical composition further contains, by mass %, at least one selected from Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

5. A method for manufacturing the cold-rolled steel sheet for hot pressing as recited in claim 3, the method comprising:
preparing a steel raw material comprising a chemical composition containing, by mass %, C: 0.28% or more and less than 0.42%, Si: 0.05% or more and 1.5% or less, Mn: 1.0% or more and 3.0% or less, P: 0.05% or less, S: 0.005% or less, Al: 0.01% or more and 0.50% or less, N: 0.005% or less, Nb: 0.001% or more and 0.10% or less, Ti: 0.001% or more and 0.15% or less, and B: 0.0002% or more and 0.0040% or less, with the balance being Fe and inevitable impurities;
hot rolling the steel raw material to obtain a hot-rolled steel sheet under a condition of a finisher delivery temperature of 850° C. to 1000° C.;
after the hot rolling, cooling the hot-rolled steel sheet to a coiling temperature of 500° C. or lower at an average cooling rate of 40° C./s or higher;
then pickling and cold rolling the coiled hot-rolled steel sheet to obtain a cold-rolled steel sheet, and then subjecting the cold-rolled steel sheet to a first annealing whereby the steel sheet is heated to a temperature range of 850° C. or higher, cooled to a temperature range of 350° C. to 450° C., held for 300 seconds or longer in the temperature range of 350° C. to 450° C., and then cooled to room temperature;
then subjecting the cold-rolled steel sheet to a second heat treatment whereby the cold-rolled steel sheet is heated to a temperature range of 720° C. to 820° C. at an average heating rate of 3° C./s to 30° C./s, held for 15 seconds or longer in the temperature range of 720° C. to 820° C., and then cooled to a cooling end temperature range of 600° C. or lower at an average cooling rate of 5° C./s or higher; and
then applying a Ni or Ni alloy coating or plating treatment to a surface of the cold-rolled steel sheet.

6. The method for manufacturing the cold-rolled steel sheet for hot pressing according to claim 5, wherein
the chemical composition further contains, by mass %, at least one selected from the group consisting of Mo: 0.50% or less, Cr: 0.50% or less, Sb: 0.001% or more and 0.020% or less, Ca: 0.005% or less, Mg: 0.005% or less, REM: 0.005% or less, V: 0.15% or less, Cu: 0.50% or less, Ni: 0.50% or less, Sn: 0.50% or less, Zn: 0.10% or less, Co: 0.10% or less, Zr: 0.10% or less, Ta: 0.10% or less, and W: 0.10% or less.

7. A method for manufacturing a hot-pressed member, comprising:
heating the cold-rolled steel sheet for hot pressing as recited in claim 3 in a temperature range of an $Ac_3$ transformation temperature to 1000° C.; and
then hot pressing the steel sheet.

8. A method for manufacturing a hot-pressed member, comprising:
heating the cold-rolled steel sheet for hot pressing as recited in claim 4 in a temperature range of an Acs transformation temperature to 1000° C.; and
then hot pressing the steel sheet.

* * * * *